US011875931B2

(12) United States Patent
Yoo et al.

(10) Patent No.: US 11,875,931 B2
(45) Date of Patent: Jan. 16, 2024

(54) COIL COMPONENT

(71) Applicant: SAMSUNG ELECTRO-MECHANICS CO., LTD., Suwon-si (KR)

(72) Inventors: Hye Mi Yoo, Suwon-si (KR); Dong Hwan Lee, Suwon-si (KR); Hwi Dae Kim, Suwon-si (KR); Sang Soo Park, Suwon-si (KR); Chan Yoon, Suwon-si (KR); Dong Jin Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 438 days.

(21) Appl. No.: 16/990,273

(22) Filed: Aug. 11, 2020

(65) Prior Publication Data

US 2021/0375535 A1 Dec. 2, 2021

(30) Foreign Application Priority Data

May 29, 2020 (KR) ........................ 10-2020-0065100

(51) Int. Cl.

| | |
|---|---|
| ***H01F 5/00*** | (2006.01) |
| ***H01F 27/33*** | (2006.01) |
| ***H01F 27/28*** | (2006.01) |
| ***H01F 27/32*** | (2006.01) |
| ***H01F 27/29*** | (2006.01) |

(52) U.S. Cl.

CPC ......... *H01F 27/33* (2013.01); *H01F 27/2804* (2013.01); *H01F 27/2828* (2013.01); *H01F 27/292* (2013.01); *H01F 27/324* (2013.01); *H01F 2027/2809* (2013.01)

(58) Field of Classification Search

CPC .................................................. H01F 27/2804
USPC ........................................................... 336/200
See application file for complete search history.

(56) References Cited

U.S. PATENT DOCUMENTS

| | | | | |
|---|---|---|---|---|
| 2017/0063322 | A1 | 3/2017 | Matsunaga | |
| 2017/0092413 | A1* | 3/2017 | Matsunaga | H01F 27/2804 |
| 2017/0310294 | A1* | 10/2017 | Sim | H01F 19/04 |
| 2018/0238936 | A1* | 8/2018 | Park | H01F 27/292 |
| 2019/0269015 | A1 | 8/2019 | Nakazawa | |

FOREIGN PATENT DOCUMENTS

| | | |
|---|---|---|
| JP | WO2018/092392 A1 | 5/2018 |
| KR | 10-2017-0026135 A | 3/2017 |

* cited by examiner

*Primary Examiner* — Ronald Hinson

(74) *Attorney, Agent, or Firm* — Morgan, Lewis & Bockius LLP

(57) ABSTRACT

A coil component includes a winding-type coil including a coil portion and first and second lead-out portions respectively connected to the coil portion; a body in which the winding-type coil is disposed, the first and second lead-out portions of the winding-type coil exposed from the body; a noise removal portion including a pattern portion spaced apart from a metal wire of the winding-type coil in the body and having both end portions spaced apart from each other to have an open-loop, and a third lead-out portion connected to the pattern portion and exposed from the body; an insulating layer disposed between the winding-type coil and the noise removal portion; and first to third external electrodes arranged on the body to be spaced apart from each other and respectively connected to the first to third lead-out portions.

16 Claims, 22 Drawing Sheets

COIL COMPONENT

CROSS-REFERENCE TO RELATED APPLICATION(S)

This application claims benefit of priority to Korean Patent Application No. 10-2020-0065100 filed on May 29, 2020 in the Korean Intellectual Property Office, the disclosure of which is incorporated herein by reference in its entirety.

TECHNICAL FIELD

The present disclosure relates to a coil component.

BACKGROUND

An example of a coil component is a winding-type coil component. In a case of the winding-type coil component, a winding-type coil in which a metal wire having a surface on which a coating layer is formed in a coil shape is coiled may be used.

As electronic devices gradually become high-performance and smaller, the number of electronic components used in such electronic devices may increase, the electronic components may be miniaturized, and an operating frequency of the electronic components may increase.

For these reasons, there is an increased possibility of problems due to relatively high frequency noise of the coil components.

SUMMARY

An aspect of the present disclosure is to provide a coil component capable of easily removing high frequency noise.

According to an aspect of the present disclosure, a coil component includes a winding-type coil including a coil portion and first and second lead-out portions respectively connected to the coil portion; a body in which the winding-type coil is disposed, the first and second lead-out portions of the winding-type coil exposed from the body; a noise removal portion including a pattern portion spaced apart from a metal wire of the winding-type coil in the body and having both end portions spaced apart from each other to have an open-loop, and a third lead-out portion connected to the pattern portion and exposed from the body; an insulating layer disposed between the winding-type coil and the noise removal portion; and first to third external electrodes arranged on the body to be spaced apart from each other and respectively connected to the first to third lead-out portions.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
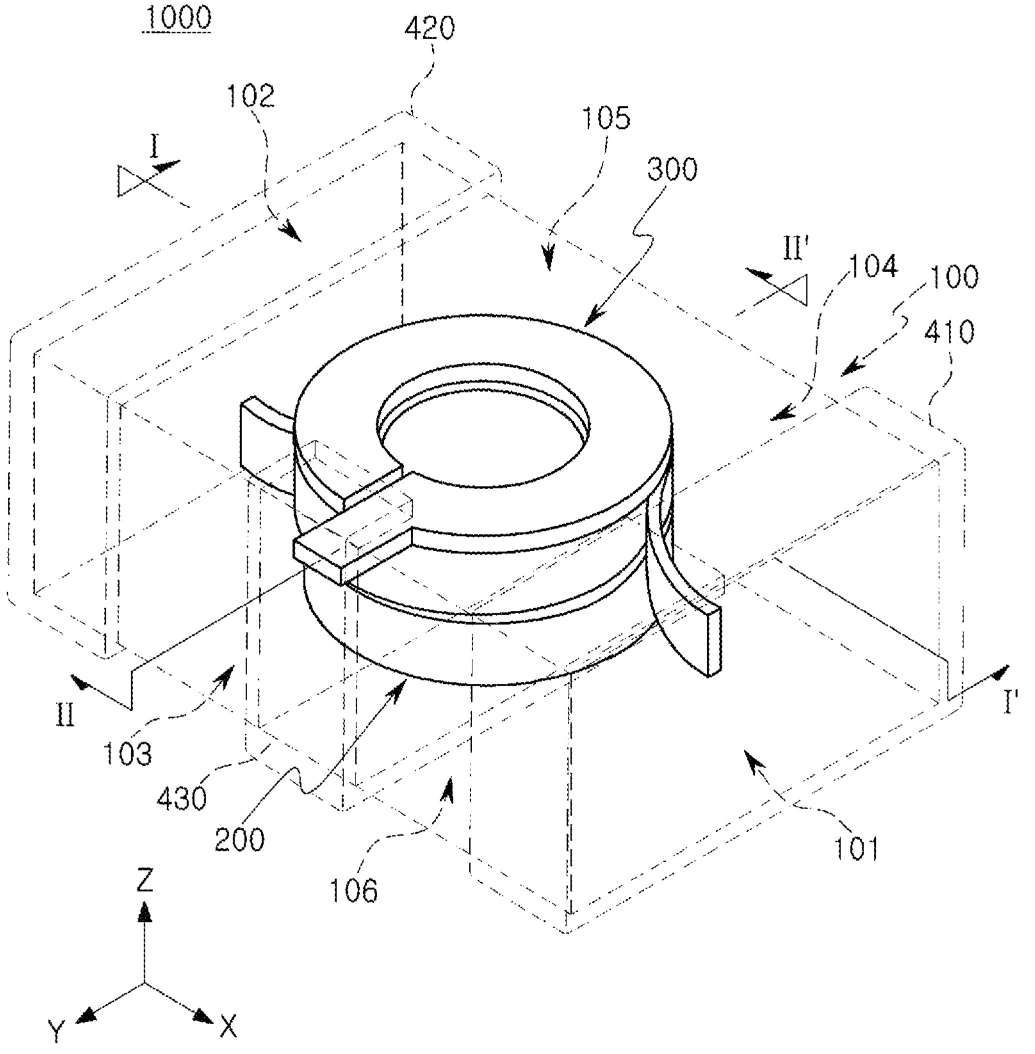
FIG. 1 is a view schematically illustrating a coil component according to a first embodiment of the present disclosure.

The terms used in the description of the present disclosure are used to describe a specific embodiment, and are not intended to limit the present disclosure. A singular term includes a plural form unless otherwise indicated. The terms "include," "comprise," "is configured to," etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms "disposed on," "positioned on," and the like, may indicate that an element is positioned on or beneath an object, and does not necessarily mean that the element is positioned above the object with reference to a gravity direction.

The term "coupled to," "combined to," and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

In the drawings, an X direction is a first direction or a length (longitudinal) direction of a body, a Y direction is a second direction or a width direction of the body, a Z direction is a third direction or a thickness direction of the body.

Hereinafter, a coil component according to an embodiment of the present disclosure will be described in detail with reference to the accompanying drawings. Referring to the accompanying drawings, the same or corresponding components may be denoted by the same reference numerals, and overlapped descriptions will be omitted.

In electronic devices, various types of electronic components may be used, and various types of coil components may be used between the electronic components to remove noise, or for other purposes.

In other words, in electronic devices, a coil component may be used as a power inductor, a high frequency (HF) inductor, a general bead, a high frequency (GHz) bead, a common mode filter, and the like.

First Embodiment & Modified Examples

Figure 2:
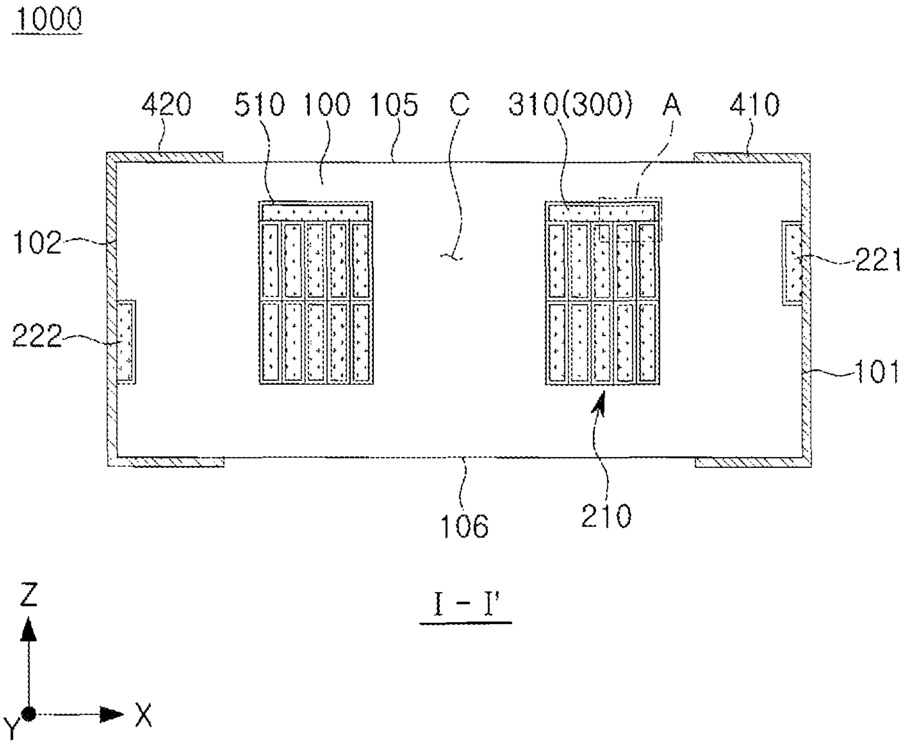
FIG. 2 is a view illustrating a cross-section taken along line I-I' of FIG. 1.
Figure 3:
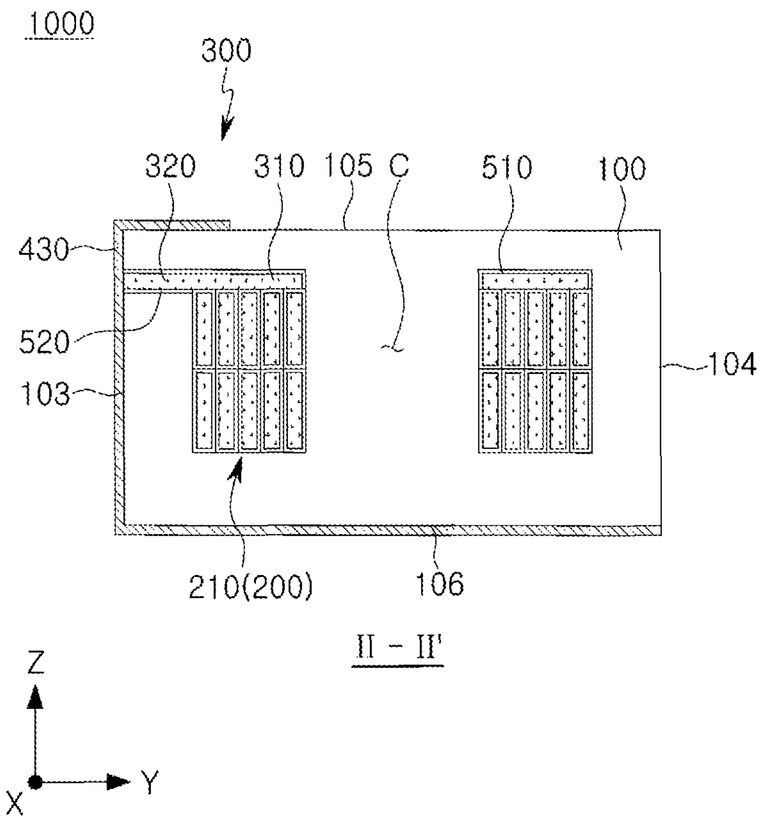
FIG. 3 is a view illustrating a cross-section taken along line II-II' of FIG. 1.
Figure 4:
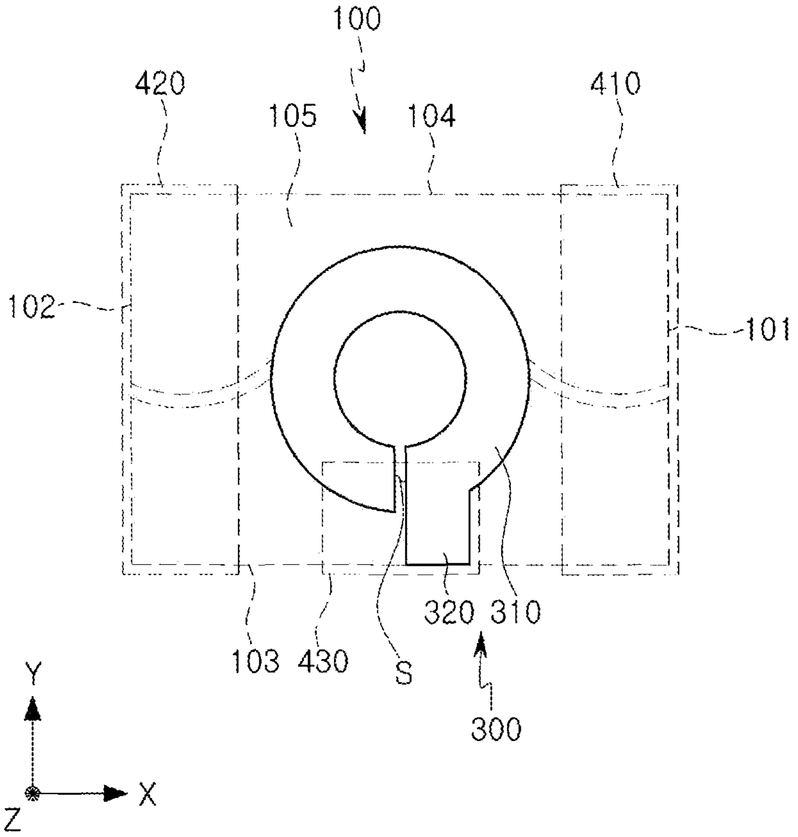
FIG. 4 is a view schematically illustrating the view of FIG. 1, when viewed from above.
Figure 5:
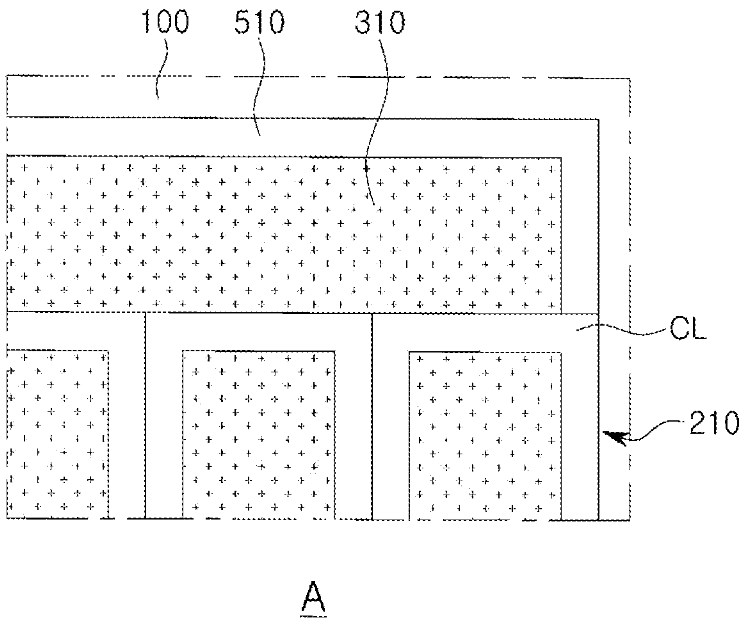
FIG. 5 is an enlarged view of portion A of FIG. 2.
Figure 6:
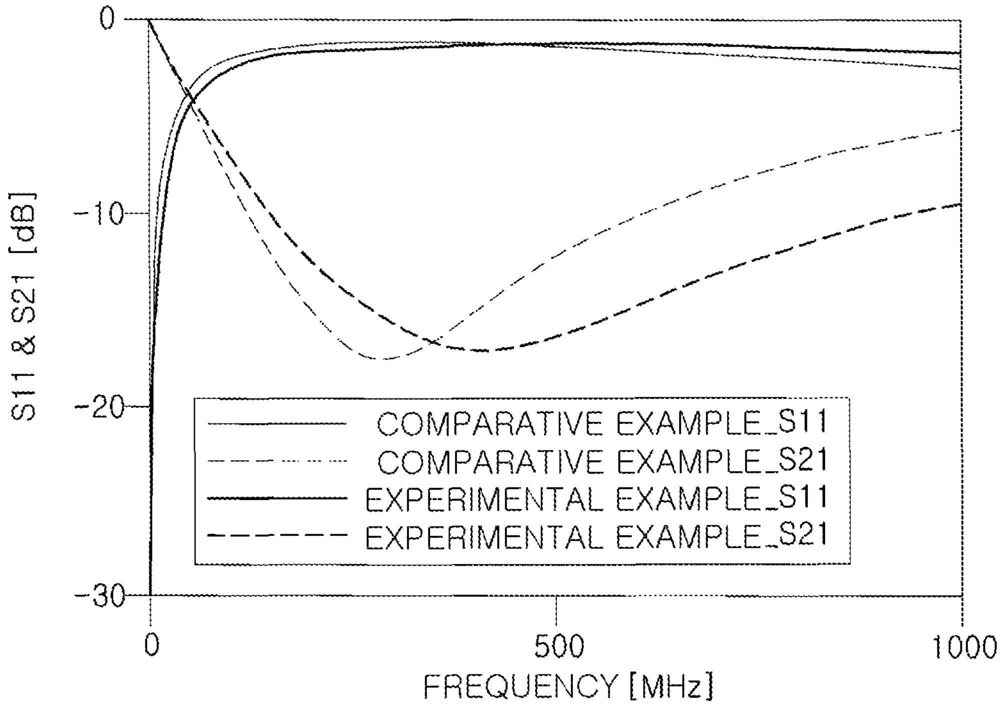
FIG. 6 is a view illustrating a signal transmission characteristic (an S-parameter) of coil components according to a first embodiment of the present disclosure and Comparative Example.

FIG. 1 is a view schematically illustrating a coil component according to a first embodiment of the present disclosure. FIG. 2 is a view illustrating a cross-section taken along line I-I' of FIG. 1. FIG. 3 is a view illustrating a cross-section taken along line II-II' of FIG. 1. FIG. 4 is a view schematically illustrating the view of FIG. 1, when viewed from above. FIG. 5 is an enlarged view of portion A of FIG. 2. FIG. 6 is a view illustrating a signal transmission characteristic (an S-parameter) of coil components according to a first embodiment of the present disclosure and Comparative Example.

Referring to FIGS. 1 to 5, a coil component 1000 according to a first embodiment of the present disclosure may include a body 100, a winding-type coil 200, a noise removal portion 300, and first to third external electrodes 410, 420, and 430.

The body 100 may form an exterior of the coil component 1000 according to this embodiment, and a winding coil 200 may be embedded therein.

The body 100 may be formed to have a hexahedral shape overall.

Referring to FIG. 1, the body 100 may include a first surface 101 and a second surface 102 opposing each other in a length direction X of the body 100, a third surface 103 and a fourth surface 104 opposing each other in a width direction Y of the body 100, and a fifth surface 105 and a sixth surface 106 opposing each other in a thickness direction Z of the body 100. Each of the first to fourth surfaces 101, 102, 103, and 104 of the body 100 may correspond to wall surfaces of the body 100 connecting the fifth surface 105 and the sixth surface 106 of the body 100. Hereinafter, both end surfaces of the body 100 may refer to the first surface 101 and the second surface 102 of the body 100, and both side surfaces of the body 100 may refer to the third surface 103 and the fourth surface 104 of the body 100. In addition, one surface and the other surface of the body 100 may refer to the sixth surface 106 and the fifth surface 105 of the body 100, respectively.

The body 100 may, for example, be formed such that the coil component 1000 according to this embodiment in which the first to third external electrodes 410, 420, and 430 to be described later are formed has a length of 2.0 mm, a width of 1.2 mm, and a thickness of 0.65 mm, but is not limited thereto. Since the above-described numerical values are only design values that do not reflect process errors and the like, it should be considered that they fall within the scope of the present disclosure, to the extent that they are recognized as process errors.

The length, the width, and the thickness of the coil components 1000 described above may be measured by a micrometer measurement method, respectively. The micrometer measurement method may be carried out by setting a zero point with a micrometer (apparatus) having a Gage R&R technique (i.e., a gage repeatability and reproducibility technique), inserting the coil component 1000 between tips of the micrometer, and turning a measuring lever of the micrometer. In measuring the length of the coil component 1000 by the micrometer measurement method, the length of the coil component 1000 may refer to a value measured once, or may refer to an arithmetic mean of values measured multiple times. This may be equally applied to the width and the thickness of the coil component 1000.

The length, the width, and the thickness of the coil component 1000 described above may be measured by a cross-section analysis method, respectively. As an example, a method for measuring the length of the coil component 1000 by the cross-section analysis method will be described. Based on a photograph for a cross-section of a central portion of the body 100 in the width direction Y, in the longitudinal direction X-thickness direction Z, captured by an optical microscope or a scanning electron microscope (SEM), the length of the coil component 1000 may refer to a maximum value among lengths of a plurality of line segments, connecting outermost boundary lines of the coil component 1000, and parallel to the longitudinal direction X of the body 100, as shown in the captured photograph. Alternatively, the length of the coil component 1000 may refer to a minimum value among lengths of a plurality of line segments, connecting outermost boundary lines of the coil component 1000, and parallel to the longitudinal direction X of the body 100, as shown in the captured photograph. Alternatively, the length of the coil component 1000 may refer to an arithmetic mean value of at least three or more lengths of a plurality of line segments, connecting outermost boundary lines of the coil component 1000, and parallel to the longitudinal direction X of the body 100, as shown in the captured photograph. This may be equally applied to the width and the thickness of the coil component 1000.

The body 100 may include a magnetic material and a resin. Specifically, the body 100 may be formed by stacking one or more magnetic composite sheets including a resin and a magnetic material dispersed in the resin. The body 100 may have a structure, other than a structure in which the magnetic material may be dispersed in the resin. For example, the body 100 may be made of a magnetic material such as ferrite.

The magnetic material may be a ferrite powder particle or a metal magnetic powder particle.

Example of the ferrite powder particle may include at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites.

The metal magnetic powder particle may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the metal magnetic powder particle may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

The metallic magnetic powder particle may be amorphous or crystalline. For example, the metal magnetic powder particle may be a Fe—Si—B—Cr-based amorphous alloy powder particle, but is not limited thereto.

The ferrite powder particle and the magnetic powder particle may each have an average diameter of about 0.1 μm to 30 μm, but are not limited thereto.

The body 100 may include two or more types of magnetic materials dispersed in resin. In this case, the term "different types of magnetic materials" means that the magnetic materials dispersed in the resin are distinguished from each other by average diameter, composition, crystallinity, and a shape.

The resin may include an epoxy, a polyimide, a liquid crystal polymer, or the like, in a single form or in combined forms, but is not limited thereto.

The body 100 may include a core C passing through a central portion of each of a coil portion 210 of the winding-type coil 200 and a pattern portion 310 of the noise removal portion 300, to be described later. The core C may be formed by filling the magnetic composite sheet with through-holes formed in the central portion of each of the coil portion 210 and the noise removal portion 300, but is not limited thereto.

The winding-type coil 200 may manifest characteristics of the coil component. For example, when the coil component 1000 of this embodiment is used as a power inductor, the winding-type coil 200 may function to stabilize the power supply of an electronic device by storing an electric field as a magnetic field and maintaining an output voltage.

The winding-type coil 200 may be disposed in the body 100, and first and second lead-out portions 221 and 222 may be exposed from a surface of the body 100. Specifically, the winding-type coil 200 may include the coil portion 210 forming at least one turn on the core C of the body 100, and the first and second lead-out portions 221 and 222 connected to the coil portion 210 and respectively exposed from the first and second surfaces 101 and 102 of the body 100. The winding-type coil 200 may be formed by coiling a metal wire such as a copper wire (a Cu-wire) or the like, including a metal line and a coating layer CL covering a surface of the metal line. Therefore, an entire surface of each of the plurality of turns of the winding-type coil 200 may be coated with the coating layer CL. The metal wire may be a rectangular wire, but is not limited thereto. When the winding-type coil 200 is formed by the rectangular wire, for example, as illustrated in FIGS. 2 and 3, the winding-type coil 200 may have a rectangular cross-section of each of the turns.

The coil portion 210 may form an innermost turn, at least one intermediate turn, and an outermost turn, from the core C toward the outside of the body 100 in the longitudinal direction X of the body 100 or in the width direction W of the body 100. The coil portion 210 may have an upper surface and a lower surface, similar to a ring shape as a whole, and an inner surface and an outer surface connecting the upper surface and the lower surface, and thus may have a cylindrical shape in which a cylindrical hollow portion is formed in a central portion as a whole. The coil portion 210 may be an air-core coil, and the core C may be disposed in the air-core of the coil portion 210.

The first and second lead-out portions 221 and 222 may be both end portions of the winding-type coil 200, and may be exposed from the first and second surfaces 101 and 102 of the body 100 to be spaced apart from each other. After the coil portion 210 may be formed among metal lines such as a copper wire of which surface is covered with the coating layer CL, or the like, the first and second lead-out portions 221 and 222 may remain. As a result, a boundary may not be formed between the first and second lead-out portions 221 and 222 and the coil portion 210. In addition, the coating layer CL may be formed on surfaces of the first and second lead-out portions 221 and 222, similar to the coil portion 210.

The coating layer CL may include an epoxy, a polyimide, a liquid crystal polymer, or the like, in a single form or in combined forms, but is not limited thereto.

The noise removal portion 300 may be configured to be electrically insulated from the winding-type coil 200 in the body 100, to discharge high frequency noise transmitted to the coil component 1000 according to this embodiment and/or high frequency noise generated from the coil component 1000 according to this embodiment, to the outside of the coil component 1000 such as a mounting substrate. For example, the pattern portion 310 and the metal wire of the winding-type coil 200 may be spaced apart from each other by the coating layer CL. Specifically, the noise removal portion 300 may include the pattern portion 310 having both end portions spaced apart from each other to form an open-loop, and a third lead-out portion 320 extending from the pattern portion 310 to be exposed from the surface of the body 100. In this embodiment, the noise removal portion 300 may be disposed such that the pattern portion 310 contacts the coating layer CL of the winding-type coil 200 forming the upper surface of the coil portion 210. As a result, the pattern portion 310 and the coil portion 210 may be capacitive-coupled by the coating layer CL, to form capacitance. Since the pattern portion 310 and the coil portion 210 form capacitance by the coating layer CL, high frequency noise transmitted to a conductor element of the winding-type coil 200 and/or high frequency noise generated from the conductor element of the winding-type coil 200 may be transmitted to the pattern portion 310, and the high frequency noise transmitted to the pattern portion 310 may be transmitted to the third external electrode 430 by the third lead-out portion 320 connected to the pattern portion 310. In this case, the term "high frequency noise" may refer to a signal having a frequency exceeding an upper limit of a frequency range set as an operating frequency, when designing the coil component 1000 according to this embodiment. As a non-limiting example, in this embodiment, high frequency noise may refer to a signal of 600 MHz or more.

The pattern portion 310 having both end portions spaced apart from each other to form an open-loop. For example, the pattern portion 310 may be formed to have a ring shape, corresponding to a shape of the upper surface of the coil portion 210 as a whole, but a slit S may be formed in the pattern portion 310 to form an open-loop. Both of the end portions of the pattern portion 310 may be separated from each other by the slit S, and the pattern portion 310 forms an open-loop. In this case, "the pattern portion 310 may form an open-loop" may refer to that, as illustrated in FIG. 4, the pattern portion 310 may have a plate-like loop in which a through-hole is formed in the central portion, but one end portion and the other end portion of the pattern portion 310 may be completely spaced apart from each other, due to the slit S or the like, to form a structure that does not contact each other. Alternatively, "the pattern portion 310 may form an open-loop" may refer to a structure that an imaginary path starting from one end portion of the pattern portion 310 toward the other end portion of the pattern portion 310 may not be circulated to the one end portion of the pattern portion 310. As long as the pattern portion 310 satisfies the condition that the one end portion and the other end portion may be spaced apart from each other to form an open-loop, those illustrated in FIG. 1, FIG. 4, or the like, and an inner surface and an outer surface may be entirely formed to have a circular ring shape, but is not limited thereto. As another example, the pattern portion 310 may be formed to have a ring shape in which the inner surface is entirely circular and the outer surface is entirely rectangular.

The third lead-out portion 320 may extend from the pattern portion 310, and may be exposed from a surface of the body 100. Specifically, in this embodiment, the third lead-out portion 320 may extend from the pattern portion 310, and may be exposed from the third surface 103 of the body 100. The third lead-out portion 320 may be connected to the third external electrode 430, which will be described later.

The noise removal portion 300 may be formed in the same process to have an integral shape without a boundary between the pattern portion 310 and the third lead-out portion 320, but the scope of the present disclosure is not limited thereto.

The pattern portion 310 may be disposed to correspond to a region in which the coil portion 210 of the winding-type coil 200 is disposed. For example, an area of the pattern portion 310 may correspond to an area of the upper surface of the coil portion 210. In this case, "an area of the pattern portion 310 may correspond to an area of the upper surface of the coil portion 210" may refer that centers of the two (e.g., a center line of the core C of FIG. 1 and the like) substantially coincide, and the areas of the two are substantially the same. For example, based on the cross-section illustrated in FIG. 2, a line width of a region of the pattern portion 310 (a distance of the pattern portion 310 in the X direction in FIG. 2) disposed on the second surface 102 of the body 100 may have a value substantially equal to a distance between a surface located closest to the core C, among surfaces of a conductor element of an innermost turn of a region disposed on the second surface 102 of the coil portion 210, and a surface located farthest to the core C, among surfaces of a conductor element of an outermost turn. Since the pattern portion 310 is disposed to correspond to the coil portion 210, an overlapping area between the pattern portion 310 and the conductor element of the coil portion 210 may be maximized. Therefore, capacitance generated between the pattern portion 310 and the coil portion 210 may increase, and an effect for removing high frequency noise may be improved.

The noise removal portion 300 may be formed of a conductive material such as copper (Cu), aluminum (Al), silver (Ag), tin (Sn), gold (Au), nickel (Ni), lead (Pb), titanium (Ti), chromium (Cr), or alloys thereof, but is not limited thereto.

The first to third external electrodes 410, 420, and 430 may be spaced apart from each other on a surface of the body 100, and may be respectively connected to the first to third lead-out portions 221, 222, and 320. Specifically, the first external electrode 410 may be disposed on the first surface 101 of the body 100, to contact and be connected to the first lead-out portion 221 of the winding-type coil 200 exposed from the first surface 101 of the body 100. The second external electrode 420 may be disposed on the second surface 102 of the body 100, to contact and be connected to the second lead-out portion 222 of the winding-type coil 200 exposed from the second surface 102 of the body 100. The third external electrode 430 may be disposed on the third surface 103 of the body 100, to contact and be connected to the third lead-out portion 320 of the noise removal portion 300 exposed from the third surface 103 of the body 100. Each of the first to third external electrodes 410, 420, and 430 may extend to the sixth surface 106 of the body 100, but may be spaced from each other on the sixth surface 106 of the body 100. In addition, each of the first and second external electrodes 410 and 420 may further extend from the first and second surfaces 101 and 102 of the body 100 to a portion of each of the third, fourth, and fifth surfaces 103, 104, and 105 of the body 100, and the third external electrode 430 may extend to the fifth surface 105 of the body 100. The shapes of the first to second external electrodes 410, 420, and 430 illustrated in FIG. 1 are merely illustrative, and the scope of the present disclosure is not limited thereto. For example, each of the first and second external electrodes 410 and 420 may be modified to have a shape, not extended to a portion of each of the third, fourth, and fifth surfaces 103, 104, and 105 of the body 100, e.g., to have an L-shape and the like.

The first and second external electrodes 410 and 420 may electrically connect the coil component 1000 to amounting substrate, when the coil component 1000 according to this embodiment is mounted on the mounting substrate such as a printed circuit board. The first and second external electrodes 410 and 420 may be signal electrodes of the coil component 1000 according to this embodiment. The coil component 1000 according to this embodiment may be mounted such that the sixth surface 106 of the body 100 faces an upper surface of the printed circuit board, and the first and second external electrodes 410 and 420, extended to the sixth surface 106 of the body 100, may be electrically connected to a connection portion of the printed circuit board by a conductive coupling member such as a solder or the like.

The third external electrode 430 may be connected to a ground of a mounting substrate, when the coil component 1000 according to this embodiment is mounted on the mounting substrate or the like, or may be connected to a ground of a electronic component package, when the coil component 1000 according to this embodiment is packaged in the electronic component package. The third external electrode 430 may be a ground electrode of the coil component 1000 according to this embodiment.

Each of the first to third external electrodes 410, 420, and 430 may include at least one of a conductive resin layer and an electrolytic plating layer. The conductive resin layer may be formed by printing a conductive paste on a surface of the body 100 and curing the printed conductive paste, and may include any one or more conductive metals selected from the group consisting of copper (Cu), nickel (Ni), and silver (Ag), and a thermosetting resin. The electrolytic plating layer may include any one or more selected from the group consisting of nickel (Ni), copper (Cu), and tin (Sn).

A first insulating layer 510 may be disposed between the noise removal portion 300 and the body 100. The first insulating layer 510 may be formed along upper and side surfaces of the noise removal portion 300, to contact the coating layer CL forming the upper surface of the coil portion 210 through the slit S formed in the pattern portion 310, but is not limited thereto. In addition, the first insulating layer 510 may not be disposed on an exposed surface of the third lead-out portion 320 exposed from the third surface 103 of the body 100. A second insulating layer 520 may cover a lower surface of the third lead-out portion 320, not coated with an insulating material, based on FIG. 3.

Each of the first and second insulating layers 510 and 520 may include an epoxy, a polyimide, a liquid crystal polymer, or the like, in a single form or in combined forms, but is not limited thereto.

The noise removal portion 300, the first insulating layer 510, and the second insulating layer 520 may be formed using an edge-wise metal wire. In this case, the first insulating layer 510 and the second insulating layer 520 may correspond to a coating layer of a metal wire, such that a boundary between the two may not be formed. After the slit S processing is performed on the metal wire, the coating layer CL of the metal wire may be partially removed such that the coating layer CL of the winding-type coil 210 and the conductor element of the metal wire are in contact with each other.

FIG. 6 is a view illustrating a signal transmission characteristic (an S-parameter) of Experimental Example and Comparative Example, respectively.

Comparative Example are coil components that do not include the noise removal portion 300 described above, and Experimental Example are coil components that include the noise removal portion 300 described above. In Comparative Example and Experimental Example, all conditions were the same, except for the presence or absence of the above-described noise removal portion 300. For example, in Comparative Example and Experimental Example, the number of turns of the coil portion, a diameter of a metal wire constituting the coil portion, and a size of a body may be all the same. In Comparative Example and Experimental Example, a signal transmission characteristic (S21) between ports was confirmed through a 3D EM Simulator HFSS using a first external electrode as an input terminal and a second external electrode as an output terminal. In Comparative Example and Experimental Example, signal transmission characteristics (S21) at frequencies of 600 MHz, 800 MHz, and 1 GHz were confirmed. In summary, the results therefrom were illustrated in Table 1 below.

TABLE 1

| Frequency | S21(@600 MHz) | S21(@800 MHz) | S21(@1 GHz) |
|---|---|---|---|
| Comparative Example | −10.3078 | −7.5286 | −5.6574 |
| Experimental Example | −14.9023 | −11.8722 | −9.5023 |
| (Amount in Change) | (4.59) | (4.34) | (3.84) |

Referring to FIG. 6 and Table 1, it can be seen that a high frequency signal was better removed in the Experimental Example than in Comparative Example. For example, it can be seen that Comparative Example in which the noise removal portion was not formed passed a relatively high frequency signal. This means that a high frequency signal may be relatively well transmitted from an input terminal to an output terminal, and means that an effect of removing high frequency noise may be negligible. It can be seen that Experimental Example in which the noise removal portion was formed did not pass a relatively high frequency signal well. As a result, it can be seen that when comparing Experimental Example and Comparative Example, Experimental Example effectively prevented unnecessary high frequency noise.

Figure 7:
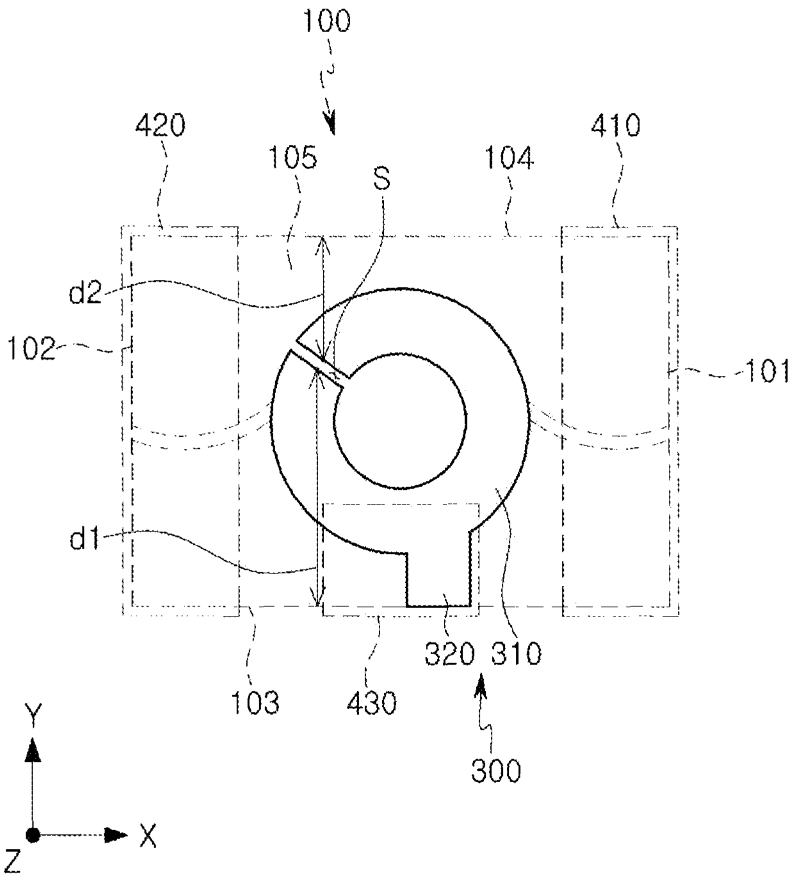
FIG. 7 is a view schematically illustrating a first modified example of a first embodiment of the present disclosure, and corresponding to FIG. 4.

FIG. 7 is a view schematically illustrating a first modified example of a first embodiment of the present disclosure, and corresponding to FIG. 4.

Referring to FIGS. 4 and 7, in the first embodiment, a position of a slit S in a pattern portion 310 may be deformed. In a case of this modified example, specifically, referring to FIG. 7, a distance (d1) from one end portion of the pattern portion 310 to a third surface 103 of a body 100 may be greater than or equal to a distance (d2) from the other end portion of the pattern portion 310 to a fourth surface 104 of the body 100. In this case, the distance (d1) from the one end portion of the pattern portion 310 to the third surface 103 of the body 100 may refer to the shortest straight line distance (d1) from a center of a side surface of the one end portion of the pattern portion 310 forming an inner wall of the slit S, in a line width direction of the pattern portion 310, to the third surface 103 of the body 100. Further, the distance (d2) from the other end portion of the pattern portion 310 to the fourth surface 104 of the body 100 may refer to the shortest straight line distance (d2) from a center of a side surface of the other end portion of the pattern portion 310 forming an inner wall of the slit S, in a line width direction of the pattern portion 310, to the fourth surface 104 of the body 100. In this modified example, since the position of the slit S may be formed in a region of the pattern portion 310 adjacent to the fourth surface 104 of the body 100, a path of high frequency noise transmitted to the pattern portion 310 may be minimized. For example, an effect of removing high frequency noise may be improved.

Figure 8:
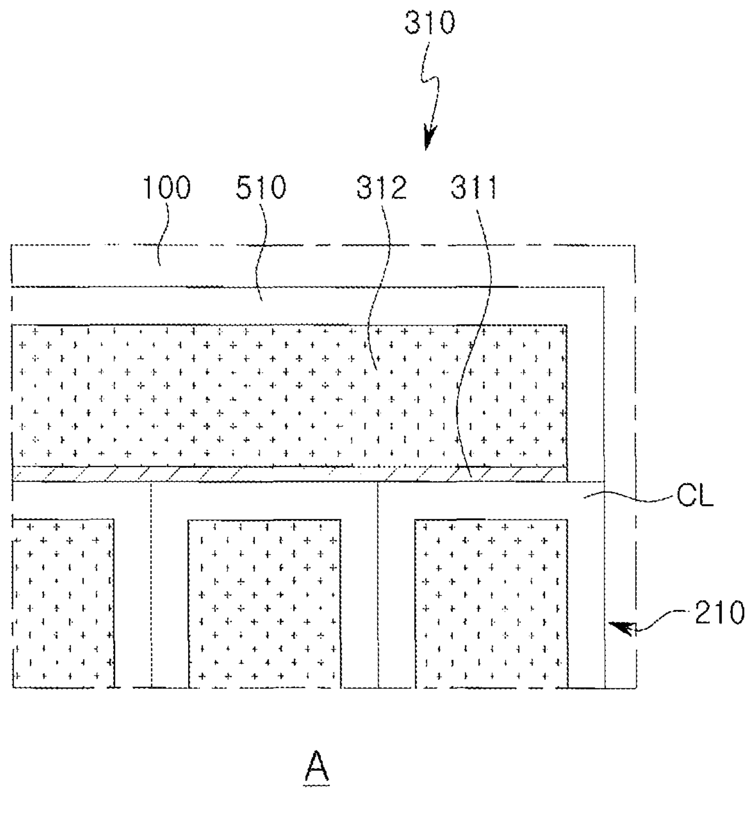
FIG. 8 is a view schematically illustrating a second modified example of a first embodiment of the present disclosure, and corresponding to FIG. 5.

FIG. 8 is a view schematically illustrating a second modified example of a first embodiment of the present disclosure, and corresponding to FIG. 5.

Referring to FIGS. 5 and 8, in a case of the first embodiment, a structure of the pattern portion 310 may be modified. Specifically, the pattern portion 310 may include a first conductive layer 311 disposed on the coating layer CL forming an upper surface of the coil portion 210, and a second conductive layer 312 disposed on the first conductive layer 311. The first conductive layer 311 may be a seed layer for forming the second conductive layer 312 by an electroplating process, and the second conductive layer 312 may be an electrolytic plating layer plated on the first conductive layer 311. The first conductive layer 311 may be formed by a vapor deposition process such as a sputtering process or an electroless plating process. Each of the first conductive layer 311 and the second conductive layer 312 may be formed of a conductive material such as copper (Cu), aluminum (Al), silver (Ag), tin (Sn), gold (Au), nickel (Ni), lead (Pb), titanium (Ti), or alloys thereof, but is not limited thereto. In this modified example, only the pattern portion 310 has been described, but the above description may be applied to the third lead-out portion 320 as well.

Figure 9:
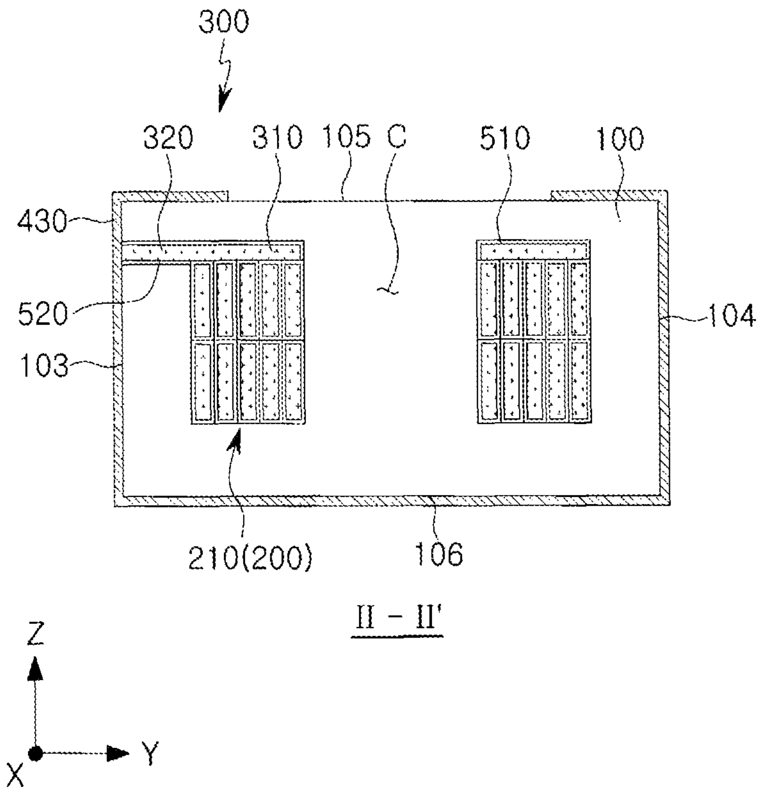
FIG. 9 is a view schematically illustrating a third modified example of a first embodiment of the present disclosure, and corresponding to FIG. 3.

FIG. 9 is a view schematically illustrating a third modified example of a first embodiment of the present disclosure, and corresponding to FIG. 3.

Referring to FIGS. 3 and 9, in a case of the first embodiment, a structure of the third external electrode 430 may be modified. Specifically, the third external electrode 430 may be formed to extend from the third surface 103 of the body 100 to the fourth surface 104, via the sixth surface 106. In addition, the third external electrode 430 may be formed to extend to the fifth surface 105 of the body 100. For example, the third external electrode 430 may be entirely formed to have a ring shape having a rectangular cross-section in which a portion of an upper side is removed.

Alternatively, unlike FIG. 9, the third external electrode 430 of this modified example may be formed to separately have one portion disposed on the third surface 103 of the body 100 and having both end portions respectively extending to the fifth and sixth surfaces 105 and 106 of the body 100, and the other portion disposed on the fourth surface 104 of the body 100 and having both end portions respectively extending to the fifth and sixth surfaces 105 and 106 of the body 100. The one portion and the other portion of the third external electrode 430 may not be in contact with each other, and may be disposed on the fifth and sixth surfaces 105 and 106 to be spaced apart from each other. In this case, the other portion of the third external electrode 430 may be used as a non-contact terminal, to be connected to a ground such as a mounting substrate or the like, or to be connected to a ground of a package, when the coil component according to this modified example is mounted. When the third external electrode 430 is formed on the third and third surfaces 103 and 104 of the body 100 by a TWA printing process or the like, the separated structure of the third external electrode 430 described above may be easily formed.

The first insulating layer 510 and the second insulating layer 520 disposed on the surface of the noise removal portion 300 described above may be an optional configuration that may be omitted in this embodiment and its modified examples.

Further, although not illustrated, an external insulating layer may be formed in a region, except for regions in which the first to third external electrodes 410, 420, and 430 are formed on the first to sixth surfaces 101, 102, 103, 104, 105, and 106 of the body 100, but the scope of the present disclosure is not limited thereto.

Second Embodiment & Modified Example

Figure 10:
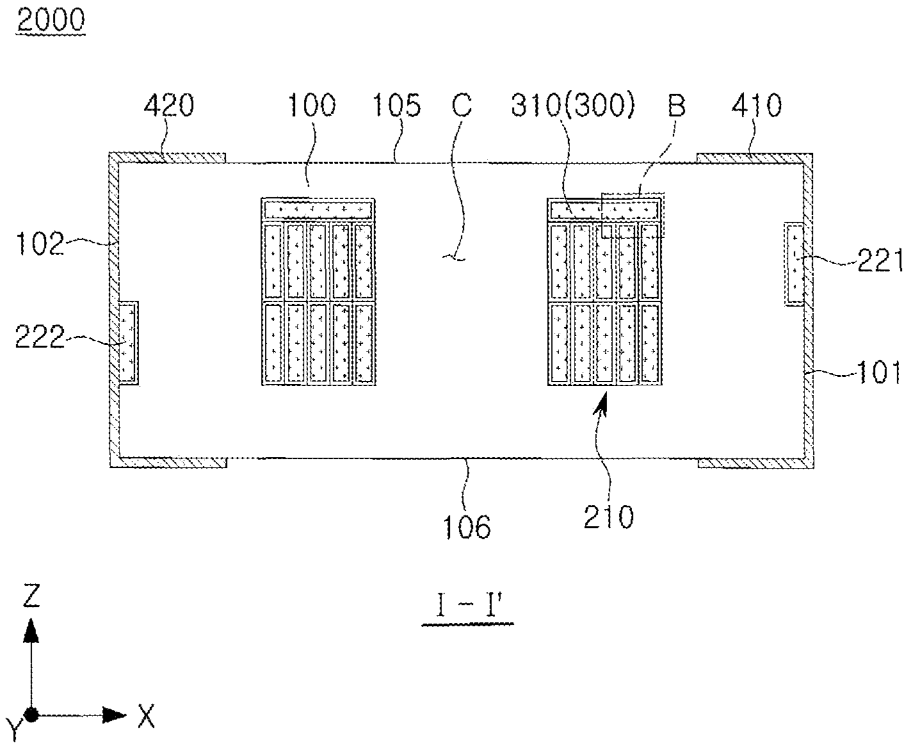
FIG. 10 is a view schematically illustrating a coil component according to a second embodiment of the present disclosure, and corresponding to FIG. 2.
Figure 11:
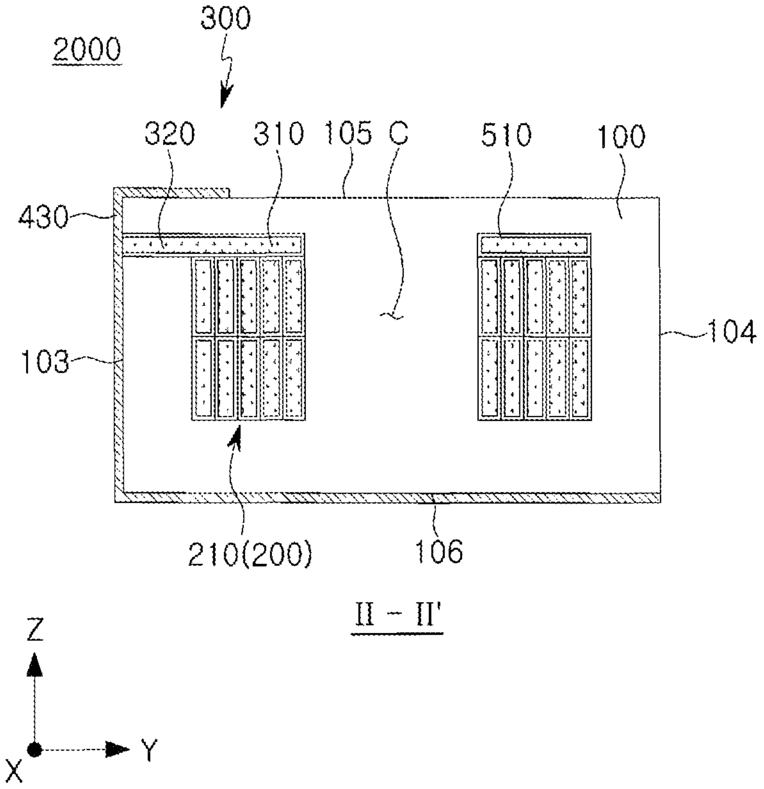
FIG. 11 is a view schematically illustrating a coil component according to a second embodiment of the present disclosure, and corresponding to FIG. 3.
Figure 12:
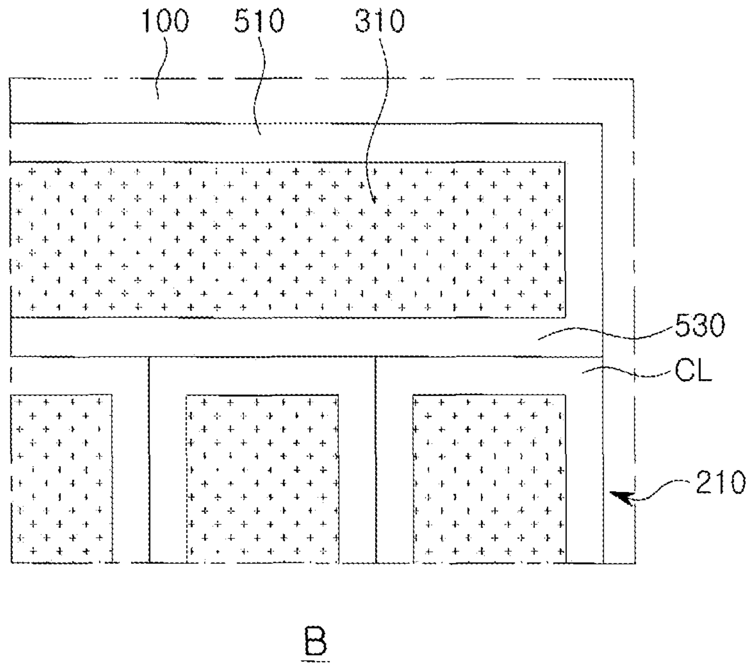
FIG. 12 is an enlarged view of portion B of FIG. 10.
Figure 13:
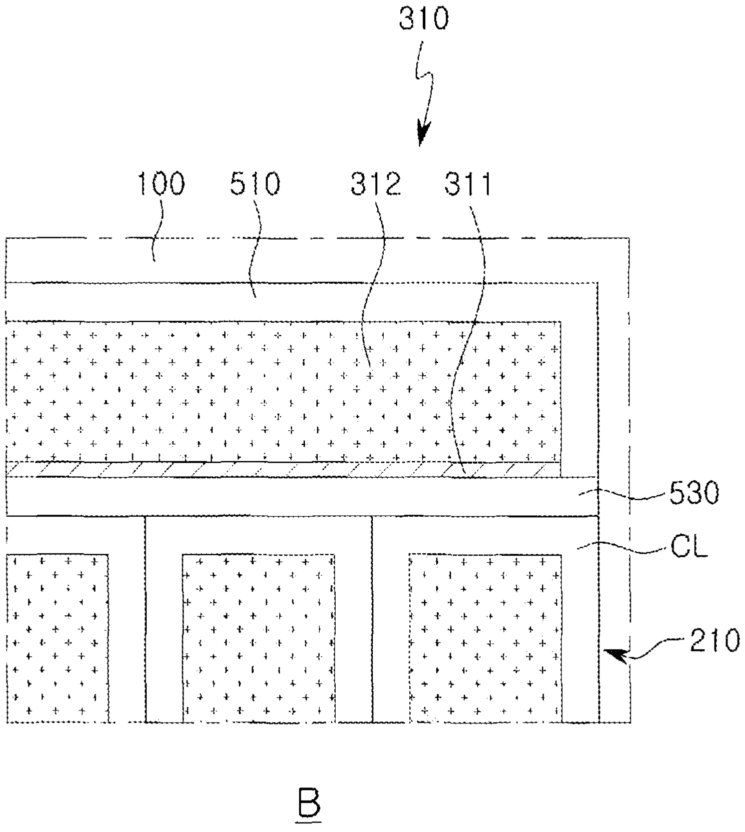
FIG. 13 is a view schematically illustrating a modified example of a second embodiment of the present disclosure, and corresponding to FIG. 12.

FIG. 10 is a view schematically illustrating a coil component according to a second embodiment of the present disclosure, and corresponding to FIG. 2. FIG. 11 is a view schematically illustrating a coil component according to a second embodiment of the present disclosure, and corresponding to FIG. 3. FIG. 12 is an enlarged view of portion B of FIG. 10. FIG. 13 is a view schematically illustrating a modified example of a second embodiment of the present disclosure, and corresponding to FIG. 12.

Referring to FIGS. 1 to 5 and FIGS. 10 to 12, a coil component 2000 according to this embodiment may further include a third insulating layer 530, compared to the coil component 1000 according to the first embodiment of the present disclosure. Therefore, in describing this embodiment, only the third insulating layer 530, different from the first embodiment of the present disclosure, will be described. For the rest of the configuration of this embodiment, the description of the first embodiment of the present disclosure and the description of the modified examples of the first embodiment may be applied as they are.

Referring to FIGS. 10 to 12, the coil component 2000 according to this embodiment may further include the third insulating layer 530 disposed between the coating layer CL of the winding-type coil 200 and the noise removal portion 300. The third insulating layer 530 may be formed on a lower surface of the pattern portion 310 and a lower surface of the third lead-out portion 320, based on the directions of FIGS. 10 and 11, and may be in contact with the coating layer CL forming the upper surface of the coil portion 210.

The winding-type coil 200 may be prepared by coiling a metal wire including the coating layer CL, but the coating layer CL may be damaged by pressure and heat during the coiling. In this case, a leakage current in the winding-type coil 200 may occur to deteriorate properties of the component. In this embodiment, electric field coupling between a conductor element of the coil portion 210 and the pattern portion 310 may be more stably secured by arranging the third insulating layer 530 between the coating layer CL forming the upper surface of the coil portion 210 and the lower surface of the noise removal portion 300.

Referring to FIG. 12, the first insulating layer 510 and the third insulating layer 530 may be integrally formed to have no boundary between them, but the scope of this embodiment is not limited thereto. As in a modified example of this embodiment illustrated in FIG. 13, a boundary may be formed between the first insulating layer 510 and the third insulating layer 530. In the case of a modified example of this embodiment illustrated in FIG. 13, an insulating material for forming the third insulating layer 530 may be stacked on the coating layer CL forming the upper surface of the coil portion 210, the first conductive layer 311 and the second conductive layer 312 may be sequentially formed, and the first insulating layer 510 may then be formed. The insulating material may be appropriately selected by considering capacitance that the coil portion 210 and the pattern portion 310 should form. For example, the insulating material may be Ajinomoto Build-up Film (ABF) or the like, but is not limited thereto.

Third Embodiment & Modified Example

Figure 14:
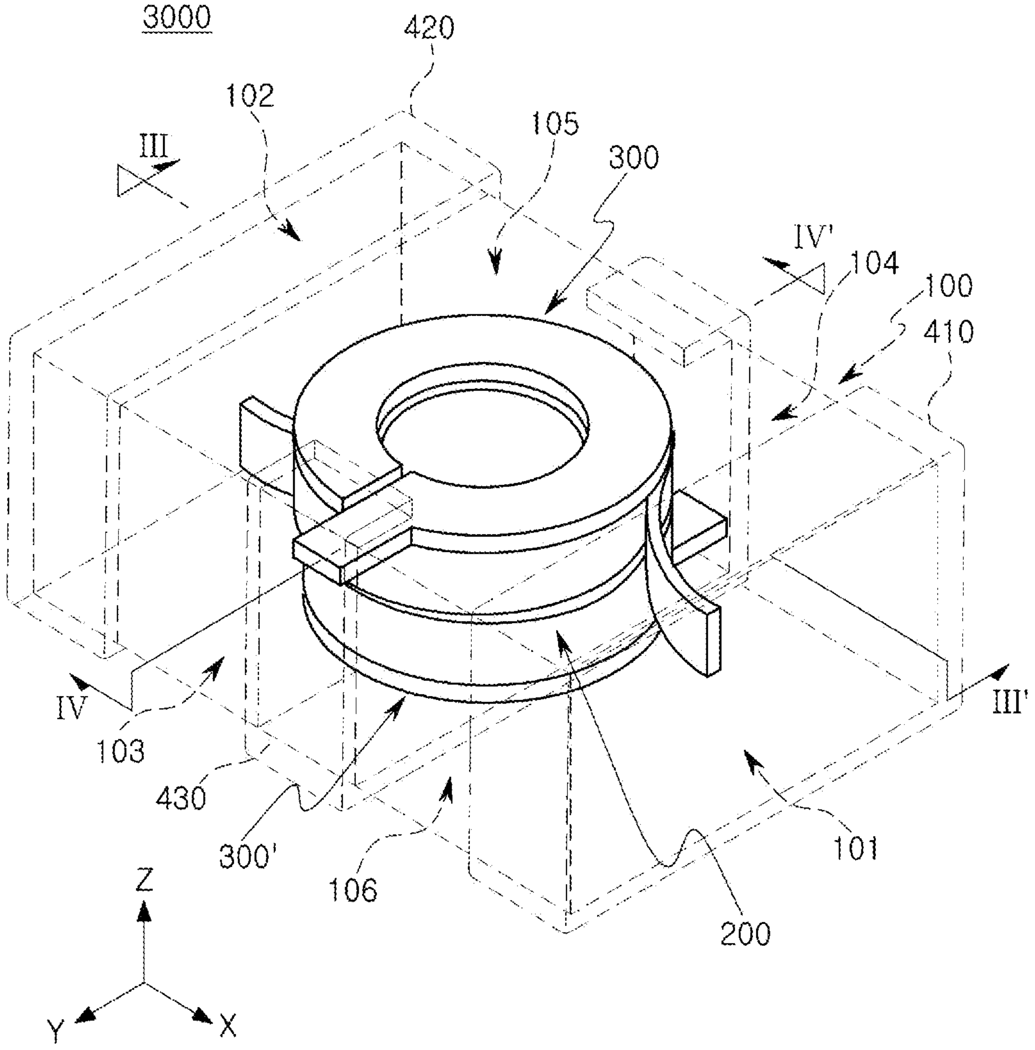
FIG. 14 is a view schematically illustrating a coil component according to a third embodiment of the present disclosure.
Figure 15:
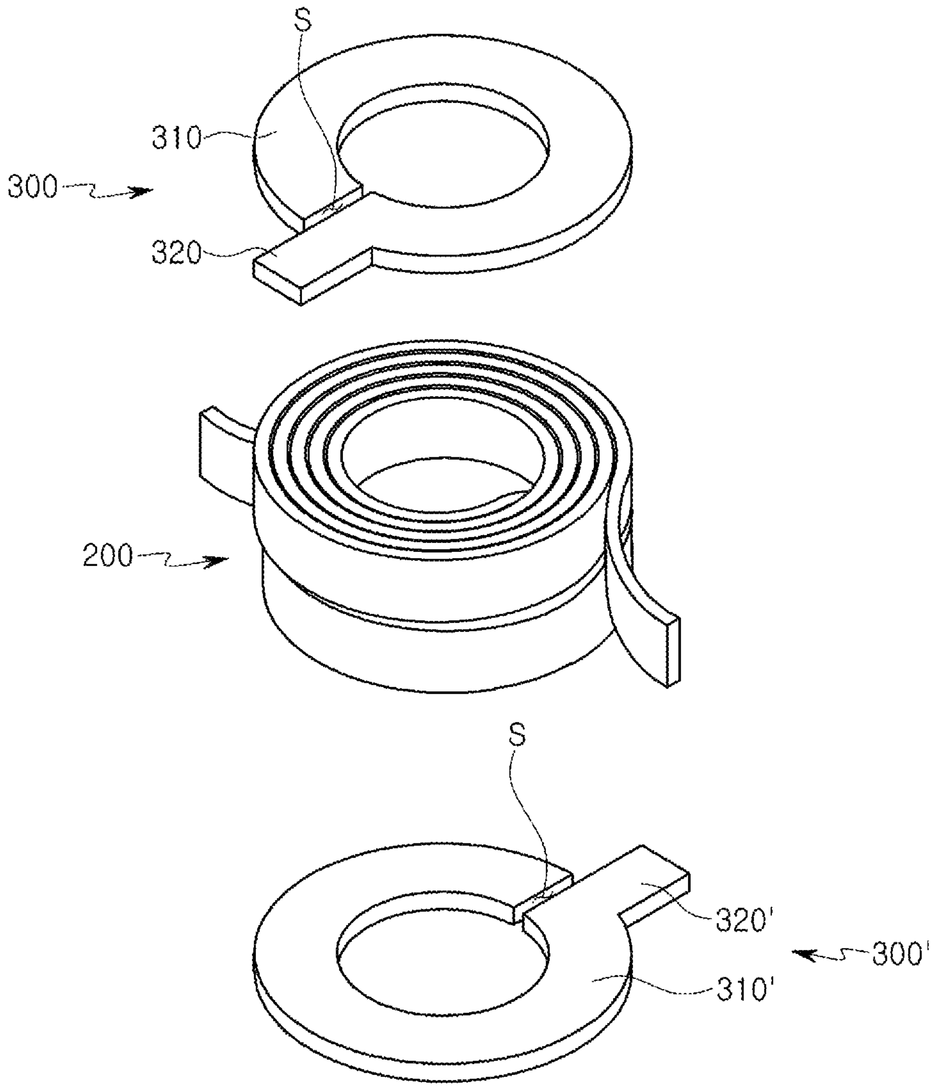
FIG. 15 is an exploded view of a noise removal portion and a winding-type coil, applied to a coil component according to a third embodiment of the present disclosure.
Figure 16:
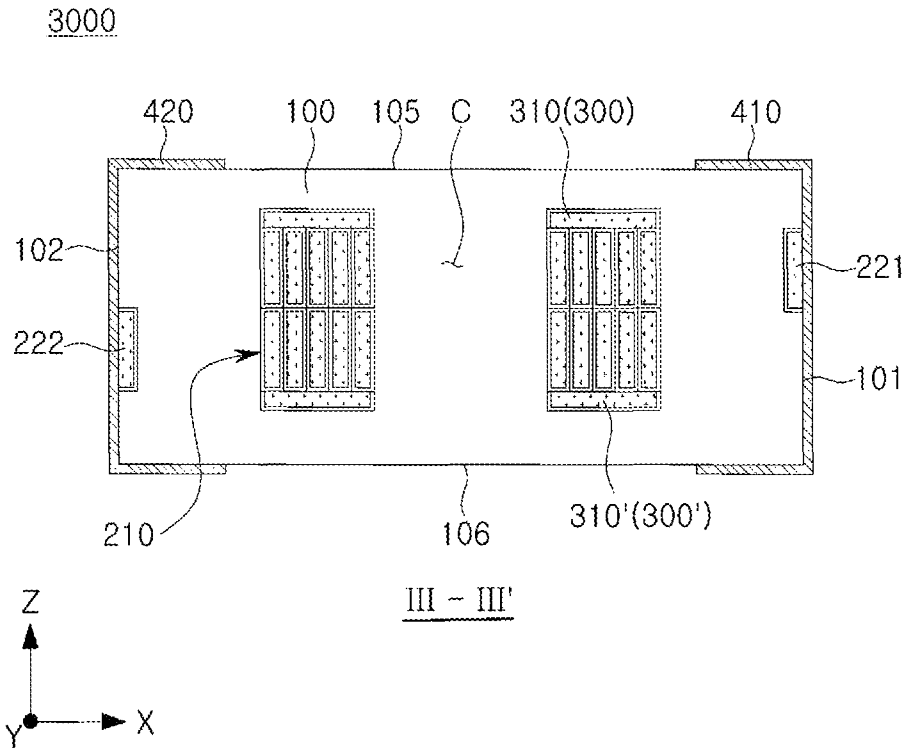
FIG. 16 is a view illustrating a cross-section taken along line III-III' of FIG. 14.
Figure 17:
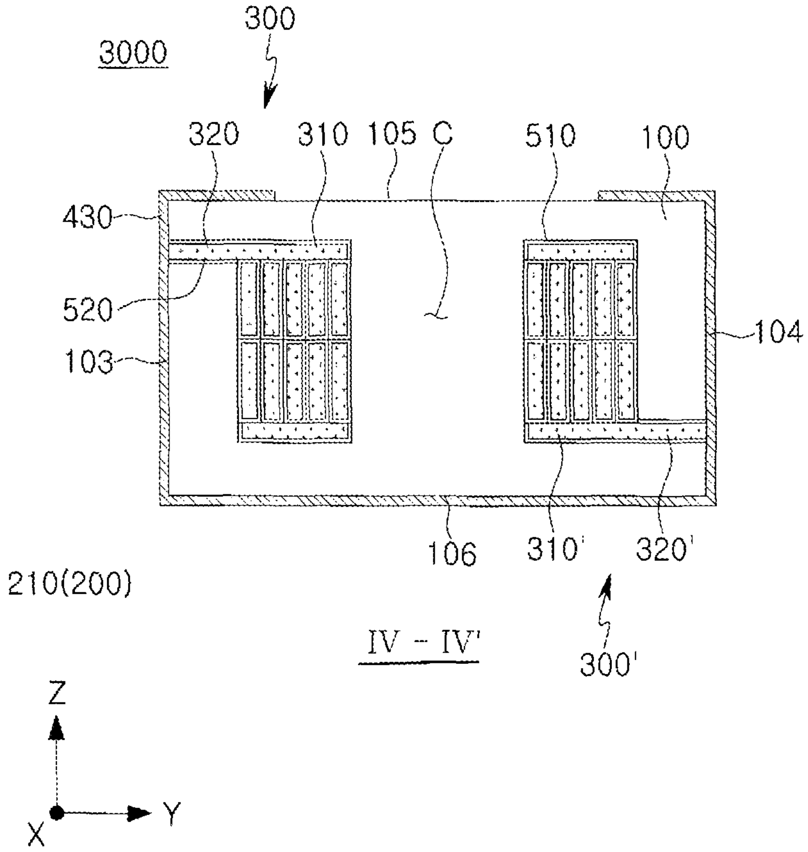
FIG. 17 is a view illustrating a cross-section taken along line IV-IV' of FIG. 14.
Figure 18:
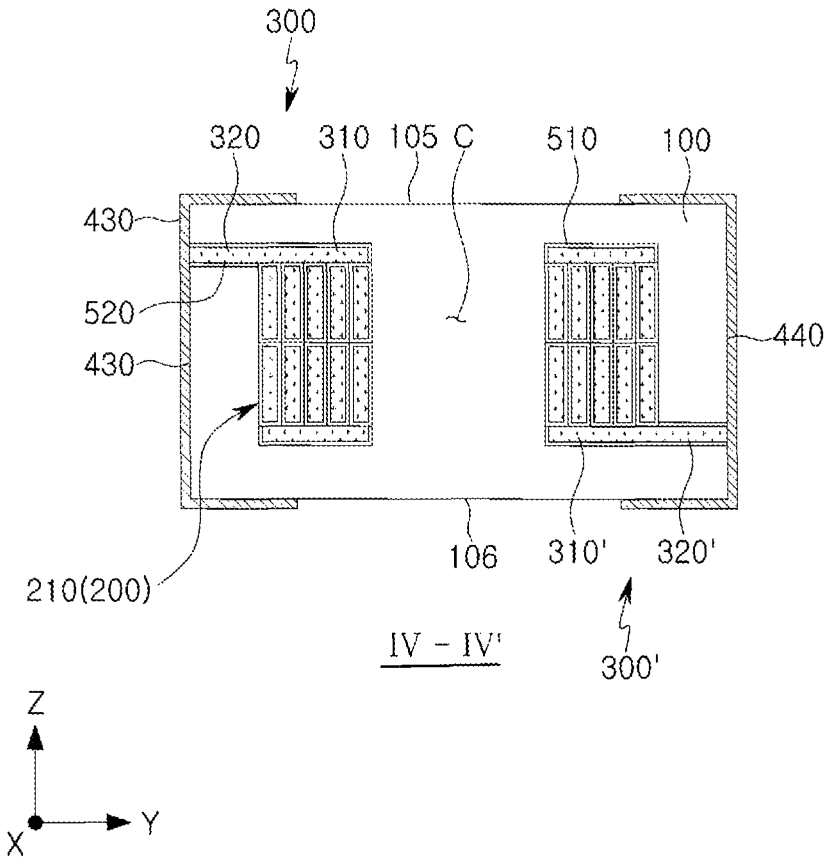
FIG. 18 is a view schematically illustrating a modified example of a third embodiment of the present disclosure, and corresponding to FIG. 17.

FIG. 14 is a view schematically illustrating a coil component according to a third embodiment of the present disclosure. FIG. 15 is an exploded view of a noise removal portion and a winding-type coil, applied to a coil component according to a third embodiment of the present disclosure. FIG. 16 is a view illustrating a cross-section taken along line III-III' of FIG. 14. FIG. 17 is a view illustrating a cross-section taken along line IV-IV' of FIG. 14. FIG. 18 is a view schematically illustrating a modified example of a third embodiment of the present disclosure, and corresponding to FIG. 17.

Referring to FIGS. 1 to 5 and FIGS. 14 to 17, when a coil component 3000 according to this embodiment is compared to the coil component 1000 according to the first embodiment of the present disclosure, the noise removal portion 300, a noise removal portion 300', and the third external electrode 430, may be differently provided. Therefore, in describing this embodiment, only the noise removal portions 300 and 300', and the third external electrode 430, different from the first embodiment of the present disclosure, will be described. For the rest of the configuration of this embodiment, the description of the first embodiment of the present disclosure and the description of the modified examples of the first embodiment may be applied as they are.

Referring to FIGS. 1 to 5 and FIGS. 14 to 17, the noise removal portions 300 and 300' applied to this embodiment may be disposed on upper and lower surfaces of the coil portion 210, respectively. In a case of this embodiment, an effect of removing high frequency noise may be improved by disposing the noise removal portions 300 and 300' on the upper and lower surfaces of the coil portion 210, respectively. The description of the noise removal portion 300 in the first embodiment and its modified example examples may be equally applied to the noise removal portion 300 disposed on the upper surface of the coil portion 210, and the noise removal portion 300' disposed on the lower surface of the coil portion 210.

The third lead-out portion 320 of the noise removal portion 300 disposed on the upper surface of the coil portion 210 may be exposed from the third surface 103 of the body 100, and the third lead-out portion 320' of the noise removal portion 300' disposed on the lower surface of the coil portion 210 may be exposed from the fourth surface 104 of the body 100. The third external electrode 430 may be disposed on the third surface 103, the sixth surface 106, and the fourth surface 104 of the body 100, to be in contact with the third lead-out portions 320 and 320', respectively. Unlike those illustrated in FIG. 17, the third lead-out portion 320 and the third lead-out portion 320' may be exposed from any one of the third surface 103 and the fourth surface 104 of the body 100, together.

In the case of the modified example according to this embodiment illustrated in FIG. 18, a fourth external electrode 440 disposed on the fourth surface 104 of the body 100 to contact and be connected to the third lead-out portion 320' may be further included. Each of the third external electrode 430 and the fourth external electrode 440 may be used as a ground electrode, when mounted.

Fourth Embodiment & Modified Example

Figure 19:
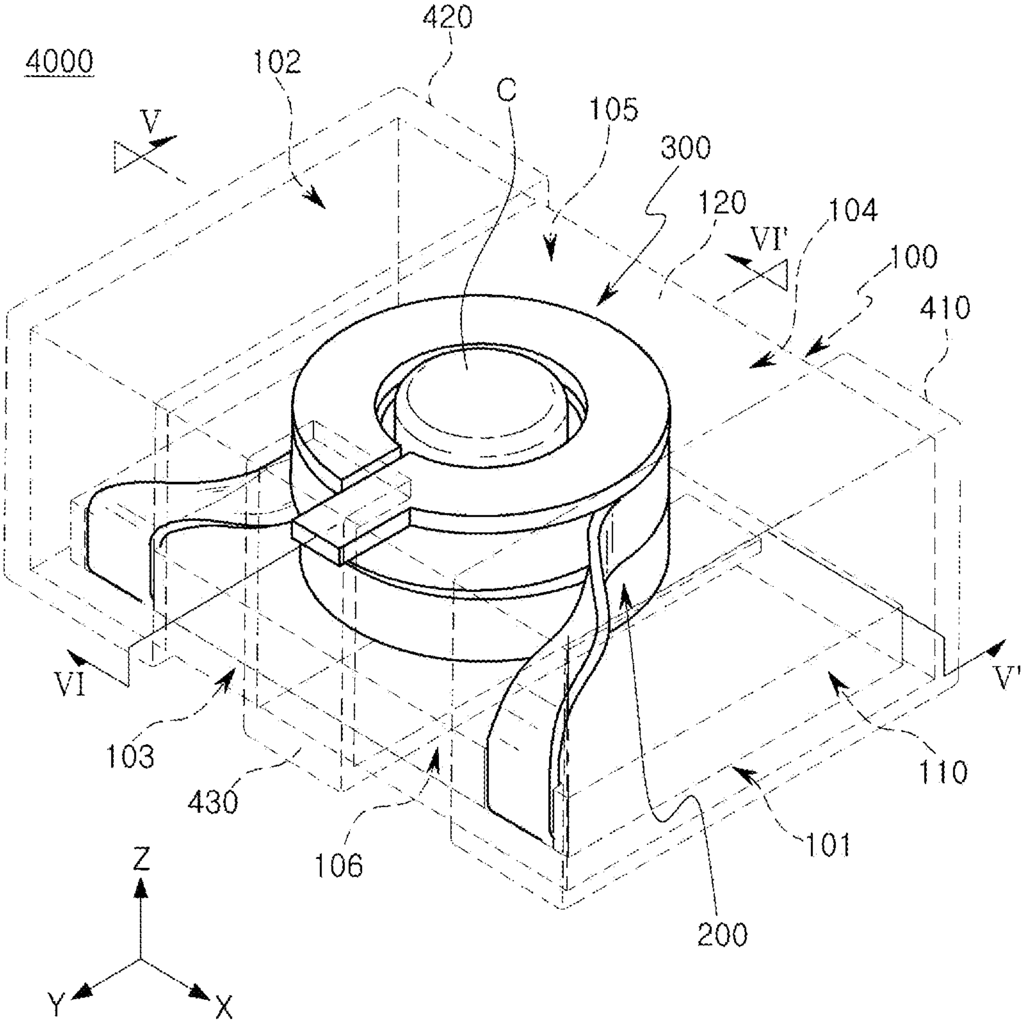
FIG. 19 is a view schematically illustrating a coil component according to a fourth embodiment of the present disclosure.
Figure 20:
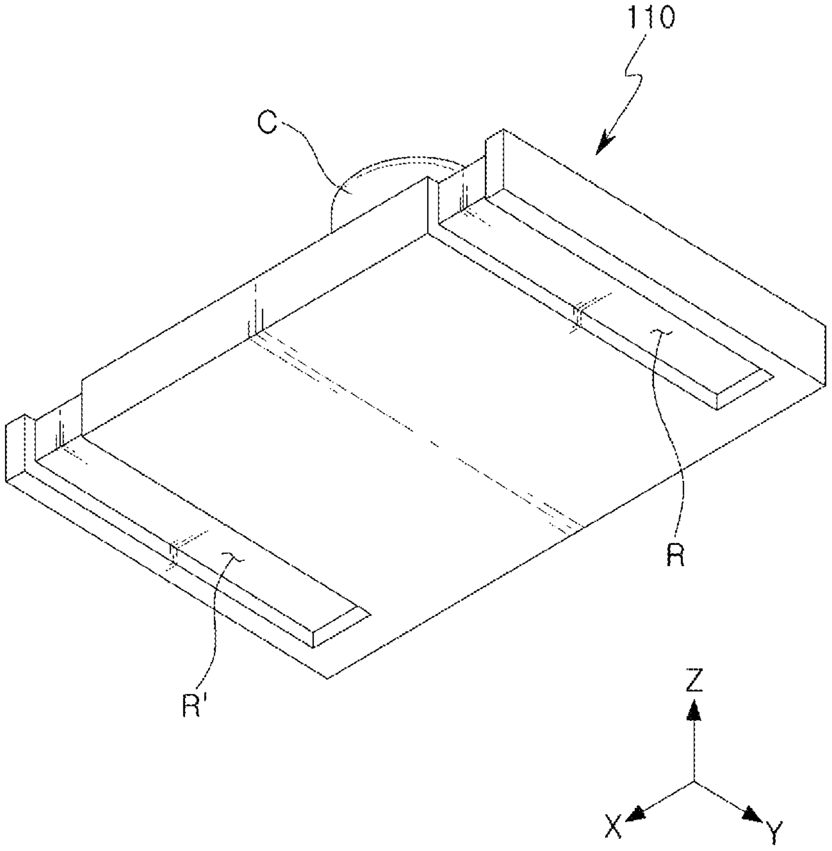
FIG. 20 is a view schematically illustrating the mold portion of FIG. 19.
Figure 21:
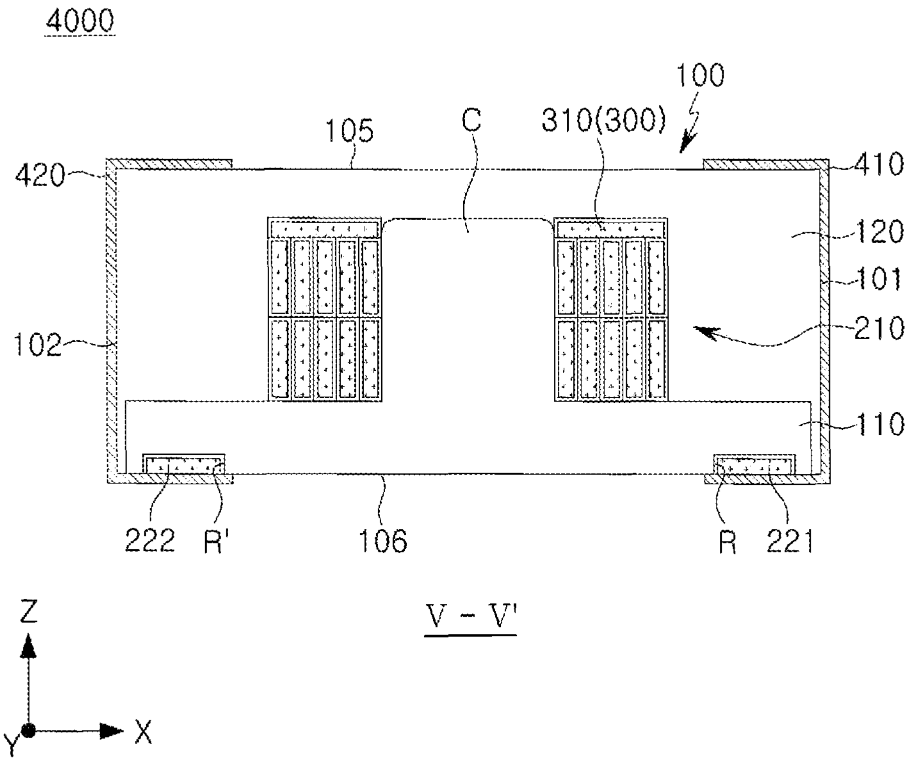
FIG. 21 is a view illustrating a cross-section taken along line V-V' of FIG. 19.
Figure 22:
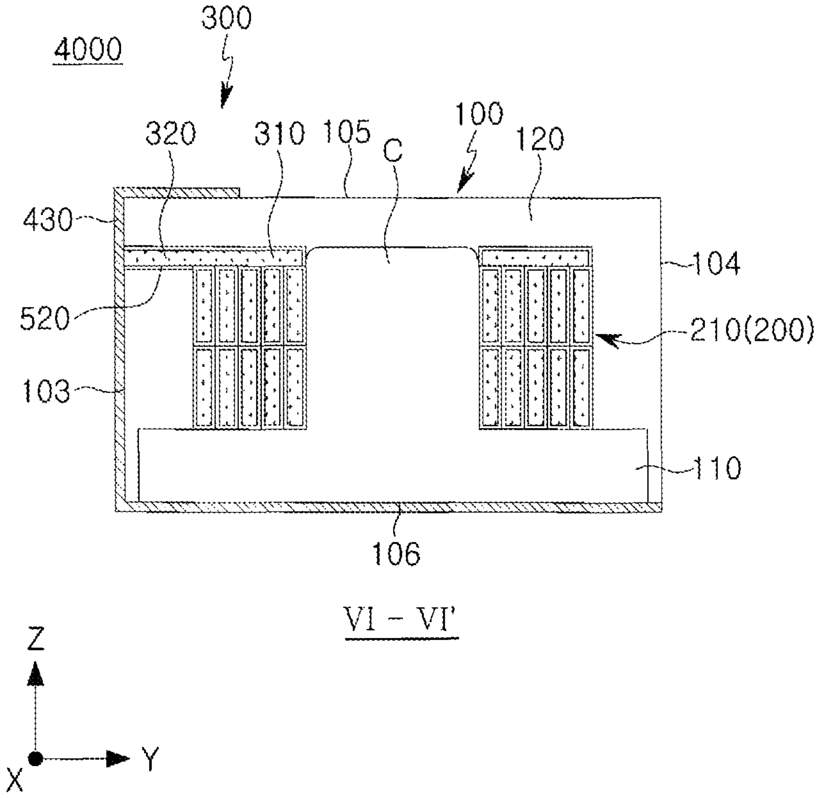
FIG. 22 is a view illustrating a cross-section taken along line VI-VI' of FIG. 19.

FIG. 19 is a view schematically illustrating a coil component according to a fourth embodiment of the present disclosure. FIG. 20 is a view schematically illustrating the mold portion of FIG. 19. FIG. 21 is a view illustrating a cross-section taken along line V-V' of FIG. 19. FIG. 22 is a view illustrating a cross-section taken along line VI-VI' of FIG. 19.

Referring to FIGS. 1 to 5 and FIGS. 19 to 22, when a coil component 4000 according to this embodiment is compared to the coil component 1000 according to the first embodiment of the present disclosure, a structure may be differently provided. Therefore, in describing this embodiment, only the body 100, different from the first embodiment of the present disclosure, will be described. For the rest of the configuration of this embodiment, the description of the first embodiment of the present disclosure and the description of the modified examples of the first embodiment may be applied as they are.

Referring to FIGS. 19 to 22, the body 100 may include a mold portion 110 and a cover portion 120 disposed on one surface of the mold portion 110. Side surfaces of the mold portion 110 and the cover portion 120 may form the first to fifth surfaces 101, 102, 103, 104, and 105 of the body 100, and the other surface of the mold portion 110 (e.g., a lower surface of the mold portion 110, based on the direction of FIGS. 19 and 20) may form the sixth surface 106 of the body 100. Hereinafter, the other surface of the mold portion 110 and the sixth surface of the body 100 may be used in the same sense.

The mold portion 110 may have the one surface and the other surface, opposing each other. The coil portion 210 of the winding-type coil 200 may be disposed between the one surface of the mold portion 110 and the cover portion 120. The core C may be disposed to protrude in a central portion of the one surface of the mold portion 110, to pass through the central portion of the coil portion 210 and the pattern portion 310.

The cover portion 120 may cover the winding-type coil 200 and the noise removal portion 300, together with the mold portion 110. The cover portion 120 may be formed by disposing the winding-type coil 200 and the noise removal portion 300 in the mold portion 110 and pressing a material for forming the cover portion 120 thereon.

At least one of the mold portion 110, the cover portion 120, and the core C may include a magnetic material.

For example, the mold portion 110 may be formed by filling a magnetic material in a mold for forming the mold portion 110. As another example, the mold portion 110 may be formed by filling a composite material including a magnetic material and an insulating resin in a mold. A process of applying high temperature and high pressure to the magnetic material or the composite material in the mold may be additionally performed, but is not limited thereto. The mold portion 110 and the core C may be integrally formed by the above-described mold such that a boundary may not be formed between them. The cover portion 120 may be formed by placing a magnetic composite sheet in which the magnetic material is dispersed in the insulating resin on the mold portion 110, the winding-type coil 200, and the noise removal portion 300, and heating and pressing the same.

The first and second lead-out portions 221 and 222 of the winding-type coil 200 may be exposed to be spaced apart from each other on the other surface of the mold portion 110, respectively. The first and second lead-out portions 221 and 222 may have a shape extending from the other surface of the mold portion 110 in the width direction Y of the body 100, respectively. The first and second lead-out portions 221 and 222 may be disposed to be spaced apart from each other in the longitudinal direction X of the body 100 on the other surface 106 of the mold portion 110. A portion of the coating layers CL of the first and second lead-out portions 221 and 222 may be removed for connection between the first and second lead-out portions 221 and 222 and the first and second external electrodes 410 and 420.

The first and second lead-out portions 221 and 222 may be exposed from the sixth surface 106 of the body 100. For example, as illustrated in FIGS. 19 to 21, in the mold portion 110, groove portions R and R' may be formed along the side surface of the mold portion 110 and the other surface of the mold portion 110. The first and second lead-out portions 221 and 222 may be disposed in the groove portions R and R', respectively. The groove portions R and R' may be formed to have a shape corresponding to the first and second lead-out portions 221 and 222. The groove portions R and R' may be formed in a process of forming the mold portion 110 using a mold, or may be formed in the mold portion 110 in a process of pressing the cover portion 120. As another example, the first and second lead-out portions 221 and 222 may pass through the mold portion 110 to be exposed from the other surface of the mold portion 110.

According to an embodiment of the present disclosure, high frequency noise may be easily removed.

While example embodiments have been illustrated and described above, it will be apparent to those skilled in the art that modified examples and variations could be made without departing from the scope of the present disclosure as defined by the appended claims.

What is claimed is:

1. A coil component comprising:

a winding-type coil including a coil portion and first and second lead-out portions respectively connected to the coil portion;

a body including a magnetic material in which the winding-type coil is disposed, the first and second lead-out portions of the winding-type coil exposed from the body;

a noise removal portion including a pattern portion spaced apart from a metal wire of the winding-type coil in the body and having both end portions spaced apart from each other to have an open-loop, and a third lead-out portion connected to the pattern portion and exposed from the body through a grounding surface of the body;

an insulating layer disposed between the winding-type coil and the noise removal portion; and first to third external electrodes arranged on the body to be spaced apart from each other and respectively connected to the first to third lead-out portions, wherein the noise removal portion is spaced apart from all remaining surfaces of the body other than the grounding surface, wherein the winding-type coil includes the metal wire and a coating layer disposed on the metal wire, wherein the coating layer is in contact with the metal wire and the noise removal portion, and wherein a portion of the coating layer arranged between the metal wire and the noise removal portion is in contact with the magnetic material.

2. The coil component according to claim 1, wherein among conductive patterns disposed in the body, the pattern portion is connected only to the third lead-out portion.

3. The coil component according to claim 1, wherein the body comprises a mold portion and a cover portion disposed on the mold portion, wherein the winding-type coil and the noise removal portion are arranged between the mold portion and the cover portion.

4. The coil component according to claim 1, wherein the body has one surface and another surface opposing each other, and both side surfaces respectively connecting the one surface and the another surface and opposing each other, and the both end portions of the pattern portion are spaced apart from each other by a slit disposed in the pattern portion, wherein the third lead-out portion is exposed from one side surface of both side surfaces of the body, and a distance from one end portion of the pattern portion to the one side surface of both side surfaces of the body is equal to or greater than a distance from another end portion of the pattern portion to the another side surface of both side surfaces of the body.

5. The coil component according to claim 1, wherein the open-loop of the noise removal portion includes one end entirely disposed in the body.

6. The coil component according to claim 1, wherein the body has a core passing through a central portion of each of the coil portion and the pattern portion.

7. The coil component according to claim 6, wherein the coil portion has at least one turn coiled around the core, wherein an region of the pattern portion corresponds to an region of an upper surface of the coil portion provided by the at least one turn.

8. The coil component according to claim 1, wherein the insulating layer includes the coating layer, and the noise removal portion is disposed to be spaced apart from the metal wire of the winding-type coil by the coating layer.

9. The coil component according to claim 8, wherein the pattern portion comprises a seed layer disposed on the coating layer forming an upper surface of the coil portion, and a plating layer disposed on the seed layer.

10. The coil component according to claim 8, wherein the insulating layer comprises an additional insulating layer disposed between the coating layer and the noise removal portion.

11. The coil component according to claim 10, wherein the pattern portion comprises a seed layer disposed on the additional insulating layer, and a plating layer disposed on the seed layer.

12. The coil component according to claim 1, wherein the body has one surface and another surface opposing each other, both end surfaces respectively connecting the one surface and the another surface and opposing each other, and both side surfaces respectively connecting both of the end surfaces and opposing each other, wherein the first to third external electrodes are arranged on the one surface of the body to be spaced apart from each other.

13. The coil component according to claim 12, wherein the third external electrode extends to one side surface of both side surfaces of the body, and is in contact with and connected to the third lead-out portion of the noise removal portion exposed from the one side surface of the body.

14. The coil component according to claim 13, wherein the third external electrode extends to and is disposed on another side surface of both side surfaces of the body.

15. The coil component according to claim 12, wherein the noise removal portion is respectively disposed on upper and lower surfaces of the coil portion, wherein the noise removal portion respectively disposed on the upper and lower surfaces of the coil portion is connected to the third external electrode.

16. The coil component according to claim 12, further comprising a fourth external electrode disposed on the one surface of the body to be respectively spaced apart from the first to third external electrodes, and the noise removal portion is respectively disposed on upper and lower surfaces of the coil portion, wherein the noise removal portion disposed on the upper surface of the coil portion is connected to the third external electrode, and the noise removal portion disposed on the lower surface of the coil portion is connected to the fourth external electrode.

* * * * *